(12) United States Patent
Choi et al.

(10) Patent No.: US 11,987,651 B2
(45) Date of Patent: May 21, 2024

(54) CATALYST COMPOSITION AND METHOD FOR PREPARING HYDROCARBON RESIN USING THE SAME

(71) Applicant: LG Chem, Ltd., Seoul (KR)

(72) Inventors: Gyeong Shin Choi, Daejeon (KR); Won Hee Kim, Daejeon (KR); Young Soo Ko, Chungcheongnam-do (KR); Ha Young Jung, Gyeonggi-do (KR); Ann Chaise Carino, Chungcheongnam-do (KR)

(73) Assignee: LG Chem, Ltd., Seoul (KR)

( * ) Notice: Subject to any disclaimer, the term of this patent is extended or adjusted under 35 U.S.C. 154(b) by 162 days.

(21) Appl. No.: 17/435,097

(22) PCT Filed: Aug. 25, 2020

(86) PCT No.: PCT/KR2020/011331
§ 371 (c)(1),
(2) Date: Aug. 31, 2021

(87) PCT Pub. No.: WO2021/040384
PCT Pub. Date: Mar. 4, 2021

(65) Prior Publication Data
US 2022/0127393 A1   Apr. 28, 2022

(30) Foreign Application Priority Data
Aug. 26, 2019   (KR) .................. 10-2019-0104242

(51) Int. Cl.
| | | |
|---|---|---|
| C08K 5/06 | (2006.01) | |
| C07F 5/02 | (2006.01) | |
| C08F 112/08 | (2006.01) | |
| C08K 5/315 | (2006.01) | |
| C08K 5/3432 | (2006.01) | |

(52) U.S. Cl.
CPC ............ C08F 112/08 (2013.01); C07F 5/027 (2013.01); C08K 5/06 (2013.01); C08K 5/315 (2013.01); C08K 5/3432 (2013.01); C08F 2410/01 (2013.01)

(58) Field of Classification Search
CPC ........ C08K 5/06; C08K 5/3432; C08K 5/315; C07F 5/027; C08F 112/08
See application file for complete search history.

(56) References Cited

U.S. PATENT DOCUMENTS

| | | | |
|---|---|---|---|
| 3,320,205 A | 5/1967 | Kiyokazu et al. | |
| 4,547,560 A | 10/1985 | Hattori et al. | |
| 6,344,529 B1 | 2/2002 | Carnahan et al. | |
| 6,441,260 B1 | 8/2002 | Goodall et al. | |
| 2003/0027955 A1 | 2/2003 | Ishii et al. | |
| 2003/0176606 A1 | 9/2003 | Bohnenpoll et al. | |
| 2003/0191015 A1 | 10/2003 | Chi-Wang Chan et al. | |
| 2004/0229157 A1 | 11/2004 | Rhodes et al. | |
| 2005/0027086 A1 | 2/2005 | Kennedy et al. | |
| 2005/0277569 A1 | 12/2005 | Goodall et al. | |
| 2006/0173227 A1 | 8/2006 | Bohnenpoll et al. | |
| 2007/0066775 A1 | 3/2007 | Rhodes et al. | |
| 2007/0208206 A1 | 9/2007 | Obrecht et al. | |
| 2008/0221285 A1 | 9/2008 | Walter et al. | |
| 2008/0249267 A1 | 10/2008 | Hanefeld et al. | |
| 2009/0124487 A1 | 5/2009 | Gibson et al. | |
| 2010/0177488 A1 | 7/2010 | Rhodes et al. | |
| 2011/0077360 A1 | 3/2011 | Obrecht et al. | |
| 2013/0324672 A1 | 12/2013 | Obrecht et al. | |
| 2015/0353589 A1 | 12/2015 | Tilley | |
| 2019/0308179 A1 | 10/2019 | Lee et al. | |
| 2022/0275006 A1* | 9/2022 | Choi .................. | C07F 5/02 |
| 2022/0289875 A1* | 9/2022 | Choi .................. | C08F 4/602 |

FOREIGN PATENT DOCUMENTS

| | | |
|---|---|---|
| CN | 102453174 A | 5/2012 |
| EP | 0002522 A1 | 6/1979 |
| EP | 0256819 A2 | 2/1988 |
| GB | 1035998 A | 7/1966 |
| JP | S55110108 A | 8/1980 |
| JP | S57100112 A | 6/1982 |
| JP | H07126317 A | 5/1995 |
| JP | 2003501524 A | 1/2003 |
| JP | 2003277428 A | 10/2003 |
| JP | 2005507029 A | 3/2005 |
| JP | 2006523767 A | 10/2006 |
| JP | 2011038106 A | 2/2011 |
| JP | 2011178723 A | 9/2011 |
| JP | 2015508078 A | 3/2015 |
| KR | 20010014290 A | 2/2001 |
| KR | 100533055 B1 | 12/2005 |
| KR | 20060049580 A | 5/2006 |
| KR | 20070085152 A | 8/2007 |

(Continued)

OTHER PUBLICATIONS

JPS55110108A original document with abstract translation (Year: 1980).*
JPS55110108A English translation (Year: 1980).*
Jutzi et al. Organometallics 2000, 19, 1442-1444. (Year: 2000).*
International Search Report for Application No. PCT/KR2020/011331 dated Dec. 7, 2020, pp. 1-2.
Jutzi, P. et al., "Synthesis, Crystal Structure, and Application of the Oxonium Acid [H(OEt2)2]+[B(C6F5)4]-," Organometallics, Mar. 2000, pp. 1442-1444, vol. 19, No. 7, American Chemical Society.

(Continued)

*Primary Examiner* — Catherine S Branch
*Assistant Examiner* — Huihong Qiao
(74) *Attorney, Agent, or Firm* — Lerner David LLP

(57) ABSTRACT

A catalyst composition and a method for preparing a hydrocarbon resin using the same are disclosed herein. In some embodiments, a catalyst composition includes an oxonium ion-based catalyst and an additive. In some embodiments, a method includes polymerizing a monomer mixture in the presence of a catalyst composition, wherein the monomer mixture comprises a C5 unsaturated hydrocarbon monomer, a C9 unsaturated hydrocarbon monomer, or a mixture thereof, wherein the catalyst composition comprising a catalyst represented by the following Formula 1 and an additive represented by the following Formula 2.

10 Claims, No Drawings

(56) References Cited

FOREIGN PATENT DOCUMENTS

| KR | 20080044870 A | 5/2008 |
| WO | 03037940 A1 | 5/2003 |
| WO | 2018084365 A1 | 5/2018 |

OTHER PUBLICATIONS

Kuhn, F. E. et al., "Solvent stabilized transition metal cations as initiators for cyclopentadiene polymerization," Macromolecular Rapid Communications, Jul. 1999, pp. 555-559, vol. 20, No. 10, Wiley-VCH, Weinheim.

Hijazi Ahmed K. et al., "Improved synthesis, characterization and catalytic application of [H(OEt2)2][B{C6H3(m-CF3)2}4]", Journal of Organometallic Chemistry, vol. 763-764, Aug. 1, 2014, pp. 65-68, Amsterdam, NL, ISSN: 0022-328X, DOI: 10.1016/j.jorganchem.2014.04.023.

Extended European Search Report for Application No. 20856684.4 dated Apr. 7, 2022. 9 pgs.

\* cited by examiner

CATALYST COMPOSITION AND METHOD FOR PREPARING HYDROCARBON RESIN USING THE SAME

CROSS-REFERENCE TO RELATED APPLICATIONS

The present application is a national phase entry under 35 U.S.C. § 371 of International Application No. PCT/KR2020/011331, filed on Aug. 25, 2020, which claims priority from Korean Patent Application No. 10-2019-0104242, filed on Aug. 26, 2019, the entire contents of which are incorporated by reference herein.

TECHNICAL FIELD

The present invention relates to a catalyst composition including an oxonium ion-based catalyst and an additive, and a method for preparing a hydrocarbon resin using the same.

BACKGROUND ART

Hydrocarbon resins are thermoplastic resins prepared using unsaturated hydrocarbon included in high-temperature pyrolysis oils such as naphtha as raw materials and having a low molecular weight. Hydrocarbon resins have a hard and brittle solid phase in a liquid phase having viscosity, and show colorless and transparent, colors such as pale yellow and dark brown, etc. according to the type of monomers. The hydrocarbon resins are safe to ultraviolet rays (UV), have properties providing adhesiveness, and are used as various materials providing an adhesive tape, product such as paint, ink, rubber and tire, medical supplies, woodworking goods, hygiene products, etc., with stickiness or adhesiveness.

Conventionally, in order to prepare hydrocarbon resins, C5 or C9 fractions which are diolefin are generally polymerized using a catalyst, and then processes of de-catalyst, washing, resin separation etc., are carried out, and recently, trials for improving physical properties have been conducted by other polymerization methods such as thermal polymerization and radical polymerization.

Particularly, hydrocarbon resins may be prepared through cationic polymerization of a monomer included in the above-described C5 or C9 fractions, and an aluminum or boron-based Lewis acid has been generally used as a catalyst or initiator for such cationic polymerization. Examples of the Lewis acid include $AlX_3$, $BX_3$ (X=F, Br, Cl, I), etc., and there are problems in that these are corrosive, and halogen components such as HCl and HF are generated during a quenching process and remained in a product to deteriorate product quality. In addition, a Lewis acid catalyst requires a large amount of the catalyst, and after the reaction, a large amount of basic materials (NaOH, KOH, $NH_4OH$, etc.) are used for removing the catalyst. Also, additional washing with water is required, and a large amount of waste water is generated.

Meanwhile, cationic polymerization which is generally used for the polymerization of hydrocarbon resins is very sensitive to humidity and impurities, and there are occasions in which the reaction is terminated by the reaction with a little amount of humidity or impurities during the propagation of a polymer chain, or chain transfer arises, and the preparation of a resin having a high molecular weight is difficult. In addition, in case of preparing a catalyst using the conventional metal composite prepared using a silver reagent, since the complete removal of a lithium salt, a sodium salt, a potassium salt, a magnesium salt or a silver salt produced during a preparation process is difficult, there are problems in that the salt may be included in polymerization reaction as impurities, and the activity of the catalyst may also be deteriorated.

PRIOR ART DOCUMENT

Patent Document (Patent Document 1) Korean Laid-open Patent Publication No. 2007-0085152

DISCLOSURE OF THE INVENTION

Technical Problem

An object of the present invention is to provide a catalyst composition including an oxonium ion-based catalyst and an additive, and a method for preparing a hydrocarbon resin using the same.

Technical Solution

In order to solve the above-described tasks, the present invention provides a method for preparing a hydrocarbon resin, including a step of polymerizing a monomer mixture including a C5 unsaturated hydrocarbon monomer, a C9 unsaturated hydrocarbon monomer, or mixtures thereof in the presence of a catalyst composition including a catalyst represented by the following Formula 1 and an additive represented by the following Formula 2:

[Formula 1]

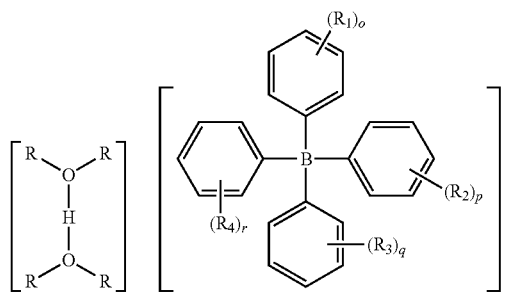

in Formula 1,

R is an alkyl group of 4 to 12 carbon atoms, $R_1$ to $R_4$ are each independently hydrogen, a halogen group, or a substituted or unsubstituted alkyl group of 1 to 20 carbon atoms, and o, p, q and r are each independently an integer of 1 to 5, $$R_a-X \quad \text{[Formula 2]}$$

in Formula 2, $R_a$ is hydrogen, an alkyl group of 1 to 20 carbon atoms, a cycloalkyl group of 3 to 20 carbon atoms, an aryl group of 6 to 20 carbon atoms, an alkylaryl group of 7 to 20 carbon atoms or an arylalkyl group of 7 to 20 carbon atoms, and X is a nitrile group, a pyridine group, an alkoxy group of 1 to 20 carbon atoms or an aryloxy group of 6 to 20 carbon atoms.

Advantageous Effects

The oxonium ion-based catalyst of the present invention may be used as a substitute for the conventional aluminum or boron-based Lewis acid catalyst, and in case of using a catalyst composition obtained by mixing the same with an additive for preparing a hydrocarbon resin, the hydrocarbon resin may be obtained in a high conversion ratio.

MODE FOR CARRYING OUT THE INVENTION

Hereinafter, the present invention will be described in more detail in order to assist the understanding of the present invention.

The "cycloalkyl group" in the present invention refers to a non-aromatic cyclic hydrocarbon radical composed of carbon atoms. The "cycloalkyl" includes as non-limiting examples, cyclopropyl, cyclobutyl, cyclopentyl, cyclohexyl and cycloheptyl, without limitation.

The "aryl group" in the present invention refers to an optionally substituted benzene ring, or a ring system which may be formed by fusing one or more optional substituents. Phenyl, naphthyl, tetrahydronaphthyl, biphenyl, indanyl, anthracyl or phenanthryl, and substituted derivatives thereof may be included, without limitation.

The "alkylaryl group" in the present invention means an aryl group which is substituted with at least one alkyl group.

The "arylalkyl group" in the present invention means an alkyl group which is substituted with at least one aryl group.

The "alkoxy group" in the present invention means a monovalent group having a chemical formula of —OR (R is the alkyl group), and particular examples thereof include a methoxy group, an ethoxy group, an isopropyloxy group, etc.

The "aryloxy group" in the present invention indicates —OR' (R' is the aryl group).

The method for preparing the hydrocarbon resin of the present invention includes a step of polymerizing a monomer mixture including a C5 unsaturated hydrocarbon monomer, a C9 unsaturated hydrocarbon monomer, or mixtures thereof in the presence of a catalyst composition including a catalyst represented by Formula 1 below and an additive represented by Formula 2 below.

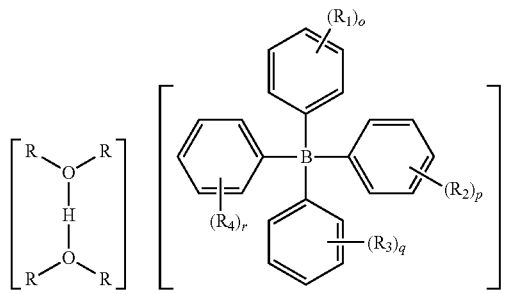

[Formula 1]

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The "composition" in the present invention includes a mixture of materials including the corresponding composition as well as a reaction product and a decomposition product formed from the materials of the corresponding composition.

The "alkyl group" in the present invention means a monovalent hydrocarbon residue of a linear type, a cyclic type or a branch type, and non-limiting examples include methyl, ethyl, n-propyl, isopropyl, n-butyl, isobutyl, t-butyl, n-pentyl, isopentyl and hexyl, without limitation.

In Formula 1,

R is an alkyl group of 4 to 12 carbon atoms, $R_1$ to $R_4$ are each independently hydrogen, a halogen group, or a substituted or unsubstituted alkyl group of 1 to 20 carbon atoms, and o, p, q and r are each independently an integer of 1 to 5, $$R_a-X \quad \text{[Formula 2]}$$

in Formula 2, $R_a$ is hydrogen, an alkyl group of 1 to 20 carbon atoms, a cycloalkyl group of 3 to 20 carbon atoms, an aryl group of 6 to 20 carbon atoms, an alkylaryl group of 7 to 20 carbon atoms or an arylalkyl group of 7 to 20 carbon atoms, and X is a nitrile group, a pyridine group, an alkoxy group of 1 to 20 carbon atoms or an aryloxy group of 6 to 20 carbon atoms.

In the present invention, the catalyst represented by Formula 1 is used for the cationic polymerization of the monomer mixture including one or more among the C5 or C9 unsaturated hydrocarbon monomers. Since the catalyst of the present invention includes an organic borate containing one or more halogen group substituents having strong electron withdrawing phenomenon in a phenyl group, as an anion part, a C—B bond is strong, and since used together with the additive represented by Formula 2 of the present invention in the cationic polymerization, excellent efficiency may be shown. On the contrary, if the substituent is not present in, or an alkyl substituent, etc. is bonded to the phenyl group of the anion part, and if mixed with the co-catalyst of the present invention, there may be problems in that side reactions are generated, and the catalyst is decomposed.

The additive represented by Formula 2 may play the role of increasing a polymerization conversion ratio in the polymerization reaction of the monomer mixture for preparing the hydrocarbon resin. The additive represented by Formula 2 includes a nitrogen atom or an oxygen atom, which has an unshared electron pair, and this facilitates the bonding with a hydrogen cation to promote chain transfer reaction transferring the hydrogen cation to improve the conversion ratio of the polymerization reaction.

In order to effectively perform such role in the present invention, it is required that a bulky functional group is not present around the nitrogen atom or oxygen atom so as not to inhibit the bonding with the hydrogen cation. In addition, in case of using a compound having a rigid structure in which numbers of the nitrogen atoms or oxygen atoms are included and positioned closely, and if an unshared electron pair makes a bond with the catalyst by accident, a very strong coordination bond may be formed to block all active sites of the catalyst, and there may be problems in that the activity of the catalyst may be markedly degraded, and the polymerization reaction may not be performed properly.

Accordingly, in the present invention, as the compounds with suitable structures which may play the role of a chain propagation agent through suitable bonding with a hydrogen cation and transferring as described above to increase a polymerization conversion ratio and not degrade the activity of the catalyst, the catalyst represented by Formula 1 and the additive represented by Formula 2 are used together.

Particularly, in Formula 1, R may be an alkyl group of 4 to 12 carbon atoms, an alkyl group of 4 to 6 carbon atoms, for example, a n-butyl group, an isobutyl group, a t-butyl group, a n-pentyl group, an isopentyl group, or a hexyl group, R1 to R4 may be each independently hydrogen, a halogen group, or a halogen group-substituted alkyl group of 1 to 12 carbon atoms, and o, p, q and r may be each independently an integer of 4 or 5. Most preferably, R1 to R4 may be each independently a halogen group, and o, p, q and r may be 5.

In addition,

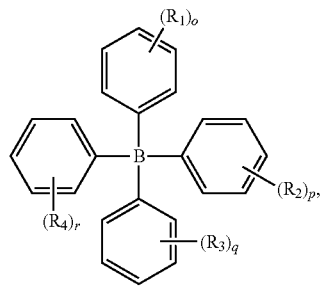

which is the organic borate included in the compound represented by Formula 1 may particularly be one or more selected from the group consisting of tetrakis(phenyl)borate, tetrakis(pentafluorophenyl)borate, tetrakis[3,5-bis(trifluoromethyl)phenyl]borate and derivatives thereof, preferably, tetrakis(pentafluorophenyl)borate.

Particularly, in Formula 2, $R_a$ may be an alkyl group of 1 to 20 carbon atoms, an alkyl group of 1 to 12 carbon atoms, an alkyl group of 1 to 6 carbon atoms, an aryl group of 6 to 20 carbon atoms, or an aryl group of 6 to 12 carbon atoms, and X may be a nitrile group, a pyridine group, an alkoxy group of 1 to 12 or 2 to 6 carbon atoms, or an aryloxy group of 6 to 12 carbon atoms.

More particularly, the additive represented by Formula 2 may be one or more selected from the group consisting of acetonitrile, benzonitrile, 2-phenylpyridine, diethyl ether and dibutyl ether, without limitation.

The equivalent ratio of the catalyst represented by Formula 1 and the additive represented by Formula 2 may be 1:1 to 1:200, and in view of preparing a hydrocarbon resin in high efficiency and controlling a number average molecular weight in a desired range, particularly, 1:1 to 1:20, or 1:1 to 1:7, 1:1 to 1:2.

If the amount of the additive is less than 1 equivalent with respect to 1 equivalent of the catalyst represented by Formula 1, the stabilizing effect of carbocation using the additive is insignificant, and the efficient preparation of the hydrocarbon resin may become difficult. If the amount of the additive is greater than 200 equivalents with respect to 1 equivalent of the catalyst represented by Formula 1, there may be problems in that the additive may be combined with the carbocation, and the polymerization reaction may be finished at early stages.

In the present invention, the catalyst represented by Formula 1 may be dissolved in a halogenated hydrocarbon solvent and used, and a nonpolar hydrocarbon solvent may be mixed with the halogenated hydrocarbon solvent to dissolve the catalyst represented by Formula 1.

In the present invention, to initiate cationic polymerization, a hydrogen atom present between oxygen atoms of the catalyst represented by Formula 1 is required to react with the monomer mixture to dissociate an ether compound (R—O—R) and produce the carbocation of the C5 or C9 unsaturated hydrocarbon monomer, and in order to maintain the carbocation thus produced in an ionic state for a long time to increase polymerization reactivity, the use of a halogenated hydrocarbon solvent having polarity is required.

However, at a point of initiating polymerization reaction, the halogenated hydrocarbon solvent is favorably used, but in a dissolved state in the halogenated hydrocarbon solvent, due to the toxicity of halogen, etc., the stability of the catalyst represented by Formula 1 is very low, and if not used for the polymerization immediately after mixing, the activity of the catalyst represented by Formula 1 may be gradually reduced according to the change of time.

On the contrary, in case of the catalyst represented by Formula 1 used in the present invention, though using the catalyst for the polymerization after preparing as a composition by dissolving in a halogenated hydrocarbon solvent such as dichloromethane (DCM) and storing for a certain time, there are advantages in that a hydrocarbon resin having equivalent physical properties may be prepared with still high polymerization conversion ratio.

In addition, the halogenated hydrocarbon solvent may be one or more selected from the group consisting of chloromethane, dichloromethane, trichloromethane, 1-chlorobutane and chlorobenzene, without limitation.

The nonpolar hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene, without limitation.

In the present invention, in the monomer mixture, a C5 unsaturated hydrocarbon monomer, a C9 unsaturated hydrocarbon monomer, or mixtures thereof may be present.

The C5 unsaturated hydrocarbon monomer may be one or more selected from the group consisting of isoprene, 1-pentene, 2-pentene, 2-methyl-2-butene, cyclopentene, cyclopentadiene, 1,3-pentadiene and 1,4-pentadiene, without limitation.

The C9 unsaturated hydrocarbon monomer may include an aliphatic hydrocarbon or aromatic hydrocarbon ring, particularly, one or more selected from the group consisting of vinyl toluene, indene and alpha-methylstyrene, without limitation.

For the preparation of the hydrocarbon resin, any type may be suitably selected and applied in the present invention only if a C5 unsaturated hydrocarbon monomer or a C9 unsaturated hydrocarbon monomer used in this technical field is selected.

In addition, the monomer mixture may further include one or more selected from the group consisting of isobutylene, 2-methyl-1-pentene, 2-methyl-2-pentene, 1,3-hexadiene, 1,4-hexadiene and dicyclopentadiene.

In the present invention, the catalyst represented by Formula 1 may be used in 0.01 wt % or more, 0.02 wt % or more, 0.2 wt % or less, 0.1 wt % or less, 0.05 wt % or less, 0.03 wt % or less based on the total weight of the monomer.

As described above, the catalyst represented by Formula 1 and the additive may be dissolved in a halogenated hydrocarbon solvent and used. In this case, the catalyst represented by Formula 1 may be used in 5 to 50 wtppm, or 10 to 40 wtppm based on the catalyst composition. In addition, the amount of the catalyst represented by Formula 1 may be 5 to 250 wtppm, or 10 to 100 wtppm, or 10 to 50 wtppm based on the monomer mixture. If the above-described numerical range is satisfied, the polymerization reaction may be efficiently performed, and if an excessive amount than the numerical range is injected, process efficiency may not be markedly improved in contrast to the cost increase of raw materials.

In the present invention, the polymerization of the monomer mixture may be performed at $-10°$ C. or higher, $-5°$ C. or higher, $-2°$ C. or higher, 30° C. or less, 10° C. or less, 5° C. or less, 2° C. or less, 0° C. In addition, the polymerization reaction may be performed at the temperature for 30 minutes or more, 50 minutes or more, 3 hours or less, 2 hours or less, hour or less. For example, the polymerization may be performed at a temperature of $-10$ to 30° C. for 30 minutes to 2 hours.

In the preparation method of the hydrocarbon resin of the present invention, a step of removing a catalyst may be further performed after the step of polymerizing the monomer mixture. Since the catalyst represented by Formula 1, used in the present invention may be efficiently removed through a physical and simple filtering step, the use and removal thereof is even further favorable than the Lewis acid catalyst of the conventional technique.

Particularly, after polymerizing the monomer mixture, the organic solvent is removed so that the organic solvent may be controlled to 40 wt % or less, 20 wt % or less or 5 wt % or less of the hydrocarbon resin.

Then, in case of a hydrocarbon resin having flowability, a step of filtering insoluble materials using a glass filter of 80 mesh or more, 100 mesh or more or 200 mesh or more is performed. Otherwise, the catalyst may be removed by passing the polymer having flowability through a silica, celite or zeolite filter.

Meanwhile, in case of a hydrocarbon resin having low flowability, flowability is given using one or more selected from the group consisting of a linear alkyl solvent, for example, pentane, cyclopentane, hexane, cyclohexane, heptane, and octane, and an ether solvent, for example, diethyl ether, and petroleum ether, and then the step of filtering through the glass filter, silica, celite or zeolite filter may be performed.

Generally, the hydrocarbon resin thus produced is dissolved in an organic solvent including pentane, cyclopentane, hexane, cyclohexane, heptane, octane, diethyl ether or petroleum ether and washed to remove a catalyst. In the present invention, the catalyst may be efficiently removed through the above-described simple filtering step, and a separate washing step may not be performed.

EXAMPLES

Hereinafter, preferred embodiments will be described in detail so as to assist the understanding of the present invention. However, the embodiments below are only illustrations, and the invention may be changed and modified in many different forms and should not be construed as being limited to the embodiments set forth herein, and such change and modification should be included in attached claims.

Preparation Example 1

In a glove box, 1 g of $[H(Et_2O)_2][B(C_6F_5)_4]$ was put in a round flask, and 10 mL of dichloromethane was put thereto. At room temperature, 5 equivalents of anhydrous dibutyl ether (purchased from Sigma-Aldrich) was put to this solution and stirred for 30 minutes. After stirring, all solvents were removed in vacuum conditions. The white powder thus obtained was washed using anhydrous hexane by 5 mL×three times, and then dried again in vacuum conditions to obtain $[H(nBu_2O)_2][B(C_6F_5)_4]$.

Example 1

5 mL of an alpha-methylstyrene monomer and 5 mL of a DCM solvent were injected into a vial, the catalyst of Preparation Example 1 (0.02 wt % based on alpha-methylstyrene) was dissolved in DCM and added thereto, and acetonitrile (the same equivalent as the catalyst of Preparation Example 1) which is an additive represented by Formula 2 was added thereto, followed by polymerizing in an ethanol bath kept to 0° C. for 1 hour. After finishing the reaction, the resultant product was precipitated in an excessive amount of methanol, and the precipitate was separated by filtering under a reduced pressure, dried at room temperature for 24 hours, and dried in vacuum at 50° C. for 1 hour to obtain a hydrocarbon resin.

Examples 2 to 5, and Comparative Examples 1 to 3

Hydrocarbon resins were prepared by the same method as in Example 1 except for changing the type of the additive represented by Formula 2 as in Table 1 below during preparing catalyst compositions.

TABLE 1

|  | Additive represented by Formula 2 |
|---|---|
| Example 1 | Acetonitrile |
| Example 2 | Benzonitrile |
| Example 3 | 2-phenylpyridine |
| Example 4 | Diethyl ether |
| Example 5 | Dibutyl ether |
| Comparative Example 1 | — |
| Comparative Example 2 | Lutidine |
| Comparative Example 3 | Phenanthroline |

Experimental Example 1

With respect to the hydrocarbon resins prepared in the Examples and the Comparative Examples, weight average molecular weight, number average molecular weight and molecular weight distribution values were measured by the methods below and summarized in Table 2.

(1) Weight Average Molecular Weight and Number Average Molecular Weight

Measurement on hydrocarbon resins was conducted under gel permeation chromatography (GPC) analysis conditions below.

Column: PL MiniMixed B×2
Solvent: THF
Flow rate: 0.3 ml/min
Specimen concentration: 2.0 mg/ml
Injection amount: 10 μl
Column temperature: 40° C.
Detector: RI detector (Agilent Co.)
Standard: polystyrene (corrected by a cubic function)
Data processing: ChemStation (2) Molecular Weight Distribution Calculation was performed by "weight average molecular weight/number average molecular weight".

TABLE 2

|  | Conversion ratio (%) | Number average molecular weight | Weight average molecular weight | Molecular weight distribution |
|---|---|---|---|---|
| Example 1 | >99 | 3200 | 5300 | 1.6 |
| Example 2 | >99 | 3300 | 5500 | 1.6 |
| Example 3 | 88 | 3100 | 4900 | 1.6 |
| Example 4 | >99 | 2100 | 3600 | 1.6 |
| Example 5 | >99 | 2100 | 3300 | 1.7 |
| Comparative Example 1 | 80 | 3700 | 5900 | 1.6 |
| Comparative Example 2 | 31 | 4300 | 6500 | 1.5 |
| Comparative Example 3 | — | — | — | — |

As shown in Example 1 of Table 2 above, a hydrocarbon resin could be prepared in a high conversion ratio by using the catalyst of the present invention. In addition, if examining Examples 2 to 5, using catalyst compositions obtained by adding various types of additives represented by Formula 2 to catalyst compositions, the conversion ratios were even further increased, and the hydrocarbon resins could be prepared in even better efficiency. In addition, in case of Comparative Example 1 in which the additive was not used, the conversion ratio was smaller than that of the Examples using the additive. By using the additive, chain transfer reaction may be promoted through a nitrogen atom or oxygen atom having an unshared electron pair which makes easy bonding with a hydrogen cation.

In case of Comparative Example 2 in which lutidine not corresponding to Formula 2 was used, methyl groups were bonded to both carbon atoms adjacent to the nitrogen atom, it could be confirmed that the bonding reaction of the nitrogen atom and the hydrogen cation was unfavorable, the chain transfer reaction was not promoted, and the polymerization conversion ratio was shown very low.

In addition, in case of Comparative Example 3 using phenanthroline in which two nitrogen atoms may form a structure capable of forming a coordination bond at the same time, the nitrogen atoms made coordination bonds to the catalyst at the same time to degrade the activity of the catalyst, and the polymerization reaction was not performed properly, and a hydrocarbon resin was not formed.

The invention claimed is:

1. A method for preparing a hydrocarbon resin, the method comprising:
polymerizing a monomer mixture in the presence of a catalyst composition,
wherein the monomer mixture comprises a C5 unsaturated hydrocarbon monomer, a C9 unsaturated hydrocarbon monomer, or a mixture thereof,
wherein the catalyst composition comprises a catalyst represented by Formula 1 and an additive represented by Formula 2:

[Formula 1]

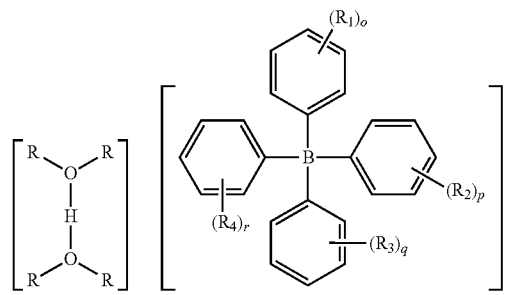

in Formula 1,

R is an alkyl group of 4 to 12 carbon atoms, $R_1$ to $R_4$ are each independently hydrogen, a halogen group, or a substituted or unsubstituted alkyl group of 1 to 20 carbon atoms, and o, p, q and r are each an integer of 5, $R_a$—X [Formula 2]

in Formula 2, $R_a$ is hydrogen, an alkyl group of 1 to 20 carbon atoms, a cycloalkyl group of 3 to 20 carbon atoms, an aryl group of 6 to 20 carbon atoms, an alkylaryl group of 7 to 20 carbon atoms or an arylalkyl group of 7 to 20 carbon atoms, and X is a nitrile group, a pyridine group, an alkoxy group of 1 to 20 carbon atoms, or an aryloxy group of 6 to 20 carbon atoms.

2. The method for preparing a hydrocarbon resin according to claim 1, wherein the C5 unsaturated hydrocarbon monomer is one or more selected from the group consisting of isoprene, 1-pentene, 2-pentene, 2-methyl-2-butene, cyclopentene, cyclopentadiene, 1,3-pentadiene, and 1,4-pentadiene.

3. The method for preparing a hydrocarbon resin according to claim 1, wherein the C9 unsaturated hydrocarbon monomer is one or more selected from the group consisting of vinyl toluene, indene, and alpha-methylstyrene.

4. The method for preparing a hydrocarbon resin according to claim 1, wherein the monomer mixture further comprises one or more of isobutylene, 2-methyl-1-pentene, 2-methyl-2-pentene, 1,3-hexadiene, 1,4-hexadiene, or dicyclopentadiene.

5. The method for preparing a hydrocarbon resin according to claim 1, wherein the additive represented by Formula 2 is one or more selected from the group consisting of acetonitrile, benzonitrile, 2-phenylpyridine, diethyl ether, and dibutyl ether.

6. The method for preparing a hydrocarbon resin according to claim 1, wherein, in Formula 1, R is a n-butyl group, an isobutyl group, a t-butyl group, a n-pentyl group, an isopentyl group, or a hexyl group.

7. The method for preparing a hydrocarbon resin according to claim 1, wherein, in Formula 1, $R_1$ to $R_4$ are each independently a halogen group or a halogen group-substituted alkyl group of 1 to 12 carbon atoms.

8. The method for preparing a hydrocarbon resin according to claim 1, wherein

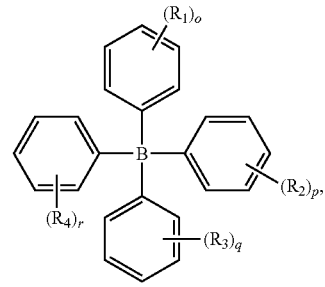

of the catalyst represented by Formula 1 is one or more selected from the group consisting of tetrakis(phenyl)borate, tetrakis(pentafluorophenyl)borate, tetrakis [3,5-bis(trifluoromethyl)phenyl]borate, and derivatives thereof.

9. The method for preparing a hydrocarbon resin according to claim 1, wherein the catalyst represented by Formula 1 is dissolved in a halogenated hydrocarbon solvent prior to polymerization of the monomer mixture.

10. The method for preparing a hydrocarbon resin according to claim 1, wherein the polymerization of the monomer mixture is performed at a temperature of −10° C. to 3020 C. for 30 minutes to 2 hours.

* * * * *